(12) United States Patent
Watanabe

(10) Patent No.: US 12,049,109 B2
(45) Date of Patent: Jul. 30, 2024

(54) PNEUMATIC TIRE

(71) Applicant: The Yokohama Rubber Co., LTD., Tokyo (JP)

(72) Inventor: Daisuke Watanabe, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 659 days.

(21) Appl. No.: 17/254,249

(22) PCT Filed: May 14, 2019

(86) PCT No.: PCT/JP2019/019082
§ 371 (c)(1),
(2) Date: Dec. 18, 2020

(87) PCT Pub. No.: WO2019/244512
PCT Pub. Date: Dec. 26, 2019

(65) Prior Publication Data
US 2021/0268839 A1 Sep. 2, 2021

(30) Foreign Application Priority Data
Jun. 19, 2018 (JP) .................. 2018-115758

(51) Int. Cl.
*B60C 11/03* (2006.01)
*B60C 11/12* (2006.01)
*B60C 11/04* (2006.01)

(52) U.S. Cl.
CPC ........ *B60C 11/0304* (2013.01); *B60C 11/033* (2013.01); *B60C 11/1236* (2013.01);
(Continued)

(58) Field of Classification Search
CPC .............. B60C 11/0304; B60C 11/04; B60C 2011/0381; B60C 2011/0388;
(Continued)

(56) References Cited

U.S. PATENT DOCUMENTS

2011/0088821 A1* 4/2011 Imakita ............... B60C 11/0302
152/209.15
2013/0112325 A1 5/2013 Mukai
(Continued)

FOREIGN PATENT DOCUMENTS

JP    2009012533 A  * 1/2009
JP    2013-100020     5/2013
(Continued)

OTHER PUBLICATIONS

International Search Report for International Application No. PCT/JP2019/019082 dated Aug. 6, 2019, 4 pages, Japan.

*Primary Examiner* — Cedrick S Williams
*Assistant Examiner* — Thomas Frank Schneider
(74) *Attorney, Agent, or Firm* — Thorpe North & Western

(57) ABSTRACT

Provided is a pneumatic tire. An outer side intermediate land portion and outer side shoulder land portion have lug grooves extending in a width direction while curving; one end of the lug grooves in the outer side shoulder land portion reaches a ground contact edge, while the other end terminates in the outer side shoulder land portion; one end of the lug grooves in the outer side intermediate land portion communicates with a shoulder main groove and the other end terminates in the outer side intermediate land portion; an opening end of the lug grooves in the outer side intermediate land portion with respect to the shoulder main groove exists on an extension line of the lug grooves in the outer side shoulder land portion; and a pair of lug grooves adjacent in the outer side intermediate land portion are disposed to not overlap each other in the circumferential direction.

12 Claims, 3 Drawing Sheets

(52) U.S. Cl.
CPC .......... *B60C 2011/0346* (2013.01); *B60C 2011/0358* (2013.01); *B60C 2011/0372* (2013.01); *B60C 2011/0381* (2013.01); *B60C 2011/0388* (2013.01); *B60C 2011/039* (2013.01); *B60C 11/04* (2013.01)

(58) Field of Classification Search
CPC ....... B60C 2011/0386; B60C 2011/039; B60C 11/1236; B60C 11/0302; B60C 11/0306; B60C 11/033
See application file for complete search history.

(56) References Cited

U.S. PATENT DOCUMENTS

| | | | |
|---|---|---|---|
| 2013/0167997 A1* | 7/2013 | Hayashi | B60C 11/0306 152/209.18 |
| 2016/0144664 A1* | 5/2016 | Kimura | B60C 11/0304 152/209.22 |
| 2018/0194173 A1 | 7/2018 | Shibai | |
| 2019/0061431 A1 | 2/2019 | Shibai | |

FOREIGN PATENT DOCUMENTS

| | | | |
|---|---|---|---|
| JP | 2015-044570 | | 3/2015 |
| JP | 2016-007973 | | 1/2016 |
| JP | 2016007973 A | * | 1/2016 |
| JP | 2016-074256 | | 5/2016 |
| JP | 2016-097777 | | 5/2016 |
| JP | 2016-141267 | | 8/2016 |
| JP | 2017-030557 | | 2/2017 |
| WO | WO 2017/022309 | | 2/2017 |
| WO | WO 2017/145681 | | 8/2017 |

* cited by examiner ated and the steering stability performance on wet road surfaces is deteriorated. Thus, there is a negative correlation between steering stability performance on dry road surfaces and steering stability performance on wet road surfaces, and it is difficult to improve both at the same time.

PNEUMATIC TIRE

TECHNICAL FIELD

The present technology relates to a pneumatic tire in which four main grooves extending in a tire circumferential direction are provided in a tread portion and in which five rows of land portions are defined by these main grooves; and more specifically, the present technology relates to a pneumatic tire capable of achieving both steering stability performance on dry road surfaces and steering stability performance on wet road surfaces in a compatible manner.

BACKGROUND ART

In a pneumatic tire, a tread pattern in which a plurality of main grooves extending in a tire circumferential direction are provided in a tread portion and in which a plurality of rows of land portions are defined by the plurality of main grooves is used (for example, see Japan Unexamined Patent Publication No. 2013-100020). In such a pneumatic tire, a plurality of lug grooves extending in a tire width direction are provided in each of the plurality of rows of land portions of the tread portion to ensure good drainage performance based on the plurality of lug grooves.

However, in a case where the number of the plurality of lug grooves in the tread portion is increased, the rigidity of the tread portion is reduced and the steering stability performance on dry road surfaces is reduced. In contrast, in a case where the number of the plurality of lug grooves in the tread portion is reduced, the drainage performance is deteriorated and the steering stability performance on wet road surfaces is deteriorated. Thus, there is a negative correlation between steering stability performance on dry road surfaces and steering stability performance on wet road surfaces, and it is difficult to improve both at the same time.

SUMMARY

The present technology provides a pneumatic tire capable of achieving both steering stability performance on dry road surfaces and steering stability performance on wet road surfaces in a compatible manner.

A pneumatic tire includes:
a tread portion extending in a tire circumferential direction and having an annular shape;
a pair of sidewall portions disposed on both sides of the tread portion; and
a pair of bead portions each disposed on a tire radial direction inner side of the pair of sidewall portions;
the tread portion being provided with four main grooves including a pair of center main grooves and a pair of shoulder main grooves extending in the tire circumferential direction;
a center land portion, a pair of intermediate land portions each located on an outer side of the center land portion, and a pair of shoulder land portions each located on an outer side of the pair of intermediate land portions being defined by the main grooves, with a mounting direction of the pneumatic tire being designated with respect to a vehicle;
the shoulder land portion on a vehicle outer side and the intermediate land portion on the vehicle outer side each having a plurality of lug grooves extending in a tire width direction while being curved;
one end of each of the plurality of lug grooves in the shoulder land portion on the vehicle outer side reaching at least a ground contact edge, while an other end terminates in the shoulder land portion on the vehicle outer side;
one end of each of the plurality of lug grooves in the intermediate land portion on the vehicle outer side communicating with the shoulder main groove on the vehicle outer side, while an other end terminates in the intermediate land portion on the vehicle outer side;
an opening end of each of the plurality of lug grooves in the intermediate land portion on the vehicle outer side with respect to the shoulder main groove on the vehicle outer side being present on an extension line of each of the plurality of lug grooves in the shoulder land portion on the vehicle outer side; and
a pair of the plurality of lug grooves adjacent in the intermediate land portion on the vehicle outer side being disposed so as not to overlap each other in the tire circumferential direction.

According to the present technology, in a pneumatic tire the mounting direction of which with respect to a vehicle is designated, by adopting a structure in which an intermediate land portion on a vehicle outer side and a shoulder land portion on the vehicle outer side are not divided by lug grooves in the land portions, the rigidity of the intermediate land portion and the shoulder land portion on the vehicle outer side may be sufficiently ensured, and thus the steering stability performance on dry road surfaces may be improved. Moreover, opening ends of the lug grooves in the intermediate land portion on the vehicle outer side with respect to the shoulder main groove on the vehicle outer side are located on the extension lines of the lug grooves in the shoulder land portion on the vehicle outer side, so it is possible to reduce the fluctuation in the groove area and contribute to the improvement in drainage performance. Furthermore, a pair of the lug grooves adjacent in the intermediate land portion on the vehicle outer side are disposed so as not to overlap each other in the tire circumferential direction, so the rigidity of the intermediate land portion may be further improved. As a result, both steering stability performance on dry road surfaces and steering stability performance on wet road surfaces may be achieved in a compatible manner.

In the present technology, an inclination angle of each of the lug grooves in the intermediate land portion on the vehicle outer side on an acute angle side with respect to the tire circumferential direction is preferably smaller than an inclination angle of each of the lug grooves in the shoulder land portion on the vehicle outer side on an acute angle side with respect to the tire circumferential direction. As a result, the rigidity of the intermediate land portion on the vehicle outer side may be sufficiently ensured while maintaining good drainage performance. As a result, the steering stability performance on dry road surfaces and the steering stability performance on wet road surfaces may be improved in a well-balanced manner.

In the present technology, a rib width from a leading edge portion of each of the lug grooves to the center main groove in the intermediate land portion on the vehicle outer side is preferably narrower than the groove width of the center main groove, and a rib width from a leading edge portion of each of the lug grooves to the shoulder main groove in the shoulder land portion on the vehicle outer side is preferably narrower than the groove width of the shoulder main groove. Accordingly, the drainage performance may be improved while ensuring the rigidity of the intermediate land portion and the shoulder land portion on the vehicle outer side. As a result, the steering stability performance on dry road surfaces and the steering stability performance on wet road surfaces may be improved in a well-balanced manner.

In the present technology, each of the lug grooves in the shoulder land portion on the vehicle outer side is preferably located on a center line passing through a leading edge portion of each of the lug grooves in the intermediate land portion on the vehicle outer side or on a position within 2 mm in the tire circumferential direction from the center line. This makes it possible to improve drainage performance and enhance the steering stability performance on wet road surfaces.

In the present technology, a groove area ratio $D_{CE}$ of the center land portion, a groove area ratio $D_{INMD}$ of the intermediate land portion on a vehicle inner side, a groove area ratio $D_{INSH}$ of the shoulder land portion on the vehicle inner side, a groove area ratio $D_{OUTMD}$ of the intermediate land portion on the vehicle outer side, and a groove area ratio $D_{OUTSH}$ of the shoulder land portion on the vehicle outer side preferably satisfy a relationship $D_{INSH} > D_{OUTMD} > D_{OUTSH} > D_{INMD} > D_{CE}$. By satisfying the relationship described above for the groove area ratio D of each land portion, the rigidity of each land portion may be sufficiently ensured while maintaining good drainage performance. This makes it possible to improve the steering stability performance on dry road surfaces and the steering stability performance on wet road surfaces in a well-balanced manner.

In the present technology, the pitch length A of each of the lug grooves in the intermediate land portion on the vehicle outer side and a shortest distance B in the tire circumferential direction of each of the lug grooves in the intermediate land portion on the vehicle outer side preferably satisfy the relationship $A \times 0.4 \leq B \leq A \times 0.5$. As a result, the rigidity of the intermediate land portion on the vehicle outer side may be sufficiently ensured while maintaining good drainage performance. As a result, the steering stability performance on dry road surfaces and the steering stability performance on wet road surfaces may be improved in a well-balanced manner.

Preferably in the pneumatic tire according to the present technology, the shoulder land portion on the vehicle inner side has a circumferential narrow groove extending in the tire circumferential direction; the center land portion, and the intermediate land portion and the shoulder land portion on the vehicle inner side each has a plurality of sipes extending in a tire width direction; one end of each of the plurality of sipes in the center land portion communicates with the center main groove on the vehicle inner side, while an other end terminates in the center land portion; one end of each of the plurality of sipes in the intermediate land portion on the vehicle inner side communicates with the center main groove on the vehicle inner side while an other end terminates in the intermediate land portion on the vehicle inner side, and each of the plurality of sipes in the intermediate land portion on the vehicle inner side is on an extension line of each of the plurality of sipes in the center land portion; and one end of each of the plurality of sipes in the shoulder land portion on the vehicle inner side communicates with the shoulder main groove on the vehicle inner side, while an other end terminates in the shoulder land portion on the vehicle inner side and intersects the circumferential narrow groove. By providing a circumferential narrow groove for the shoulder land portion on the vehicle inner side and by providing the plurality of sipes for each land portion on the vehicle inner side, the drainage performance may be effectively improved.

In the present technology, preferably the center main groove on the vehicle outer side has a chamfered portion having a zigzag shape; the lug grooves in the intermediate land portion on the vehicle outer side each have bent portions bent toward one side in the tire circumferential direction; a plurality of narrow grooves that extend intermittently along the tire circumferential direction without communicating with the bent portions are provided in the intermediate land portion on the vehicle outer side; and these narrow grooves are disposed substantially parallel to the center main groove on the vehicle outer side. The center main groove having a zigzag shape contributes to improvement in steering stability performance on wet road surfaces based on an edge effect thereof. Moreover, by each providing the bent portions in the lug grooves in the intermediate land portion on the vehicle outer side and by providing the plurality of narrow grooves intermittently along the tire circumferential direction, the effect of improving the wet performance may be increased based on the edge effect of the bent portions and the plurality of narrow grooves. Furthermore, by disposing the plurality of narrow grooves substantially parallel to the center main groove having a zigzag shape, the rigidity of the land portions may be made uniform, and the occurrence of uneven wear may be suppressed.

In the present technology, a groove area ratio is the ratio of the total area of the grooves included in the land portions to the total area of the land portions in a ground contact region. The ground contact region is a region in the tire width direction that corresponds to a maximum linear distance in the tire width direction on a contact surface formed on the flat plate, when the tire is filled with air pressure corresponding to a maximum load capacity specified for each tire according to the standards (JATMA (The Japan Automobile Tyre Manufacturers Association, Inc.), TRA (The Tire and Rim Association, Inc.), ETRTO (The European Tyre and Rim Technical Organisation), and the like) based on the tire and is placed vertically on a flat plate in a stationary state and when a load equivalent to 80% of the maximum load capacity is applied. A ground contact edge is the outermost position in the tire width direction of the ground contact region.

DETAILED DESCRIPTION

Figure 1:
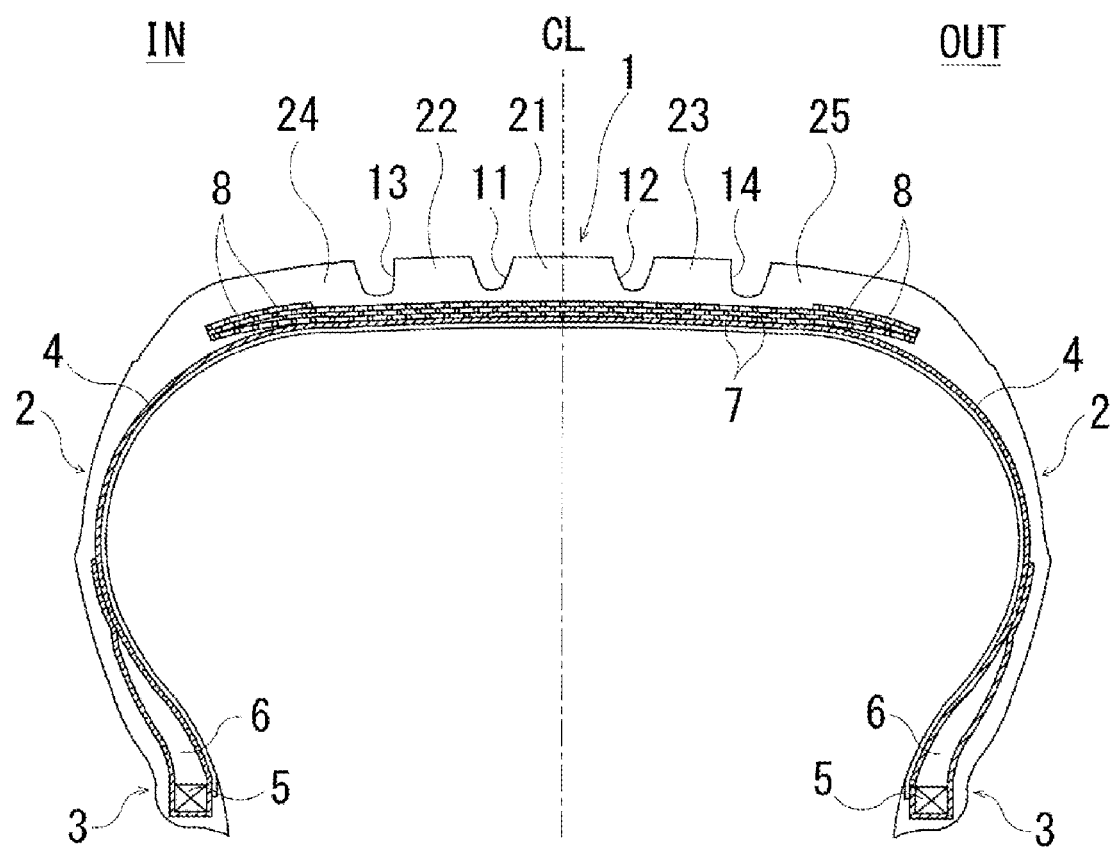
FIG. 1 is a meridian cross-sectional view illustrating one example of a pneumatic tire according to an embodiment of the present technology.
Figure 2:
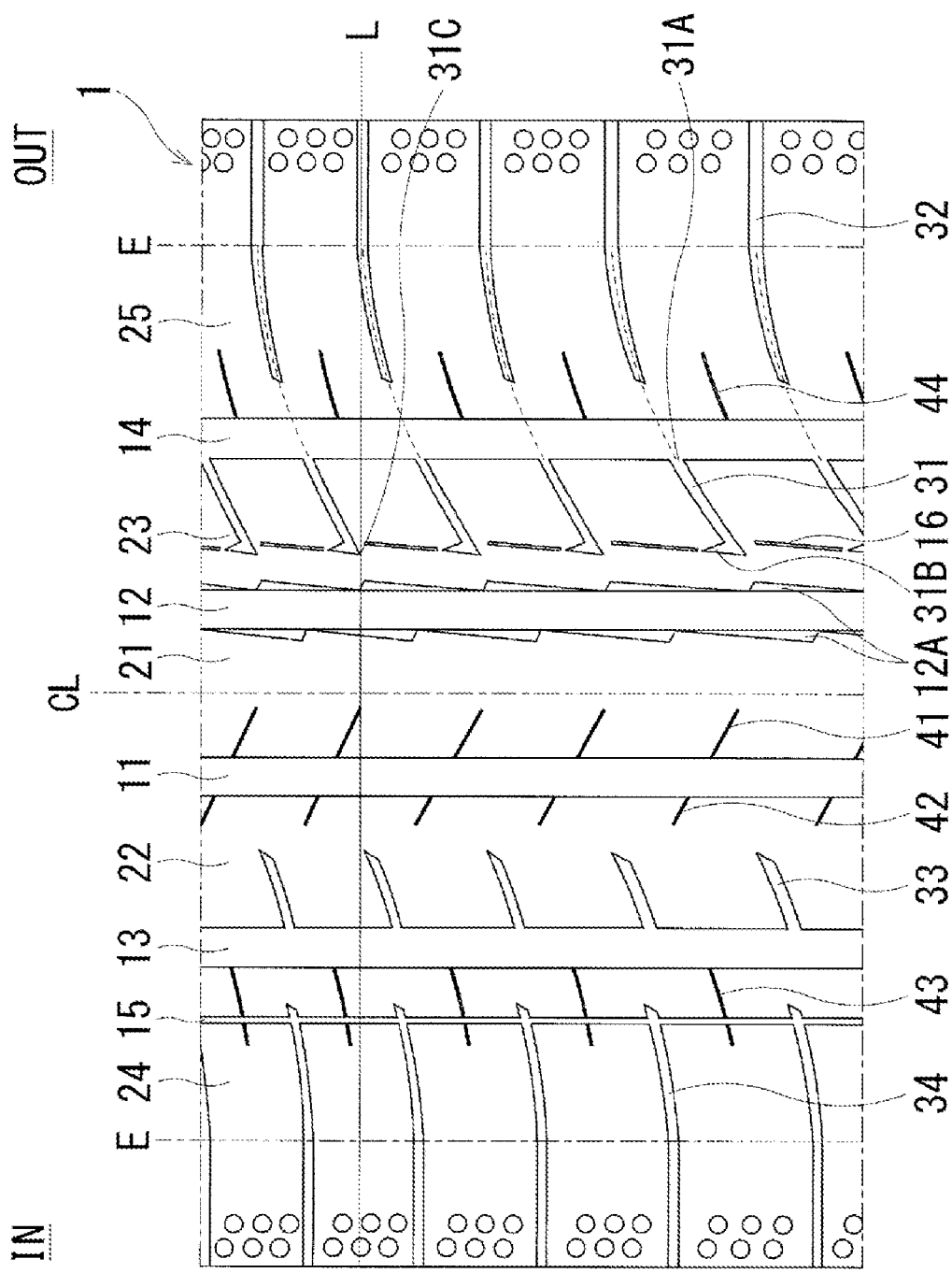
FIG. 2 is a developed view illustrating a tread pattern of the pneumatic tire according to the embodiment of the present technology.

Configurations of embodiments of the present technology will be described in detail below with reference to the accompanying drawings. FIGS. 1 and 2 illustrate a pneumatic tire according to an embodiment of the present technology. This pneumatic tire has a mounting direction of tire front/back that is designated when mounted on a vehicle. In FIGS. 1 and 2, IN is a vehicle inner side when the tire is mounted on a vehicle, and OUT is a vehicle outer side when the tire is mounted.

As illustrated in FIG. 1, a pneumatic tire according to an embodiment of the present technology includes: a tread portion 1 having an annular shape and extending in a tire circumferential direction, a pair of sidewall portions 2, 2 disposed on both sides of the tread portion 1, and a pair of bead portions 3, 3 disposed on a tire radial direction inner side of the sidewall portions 2.

A carcass layer 4 is mounted between the pair of bead portions 3, 3. The carcass layer 4 includes a plurality of reinforcing cords extending in a tire radial direction and is folded back around a bead core 5 disposed in each of the bead portions 3 from a tire inner side to a tire outer side. A bead filler 6 having a triangular cross-sectional shape formed from a rubber composition is disposed on an outer circumference of the bead core 5.

A plurality of belt layers 7 are embedded on an outer circumferential side of the carcass layer 4 in the tread portion 1. The plurality of belt layers 7 each include a plurality of reinforcing cords that are inclined with respect to the tire circumferential direction, the plurality of reinforcing cords being disposed between layers in a criss-cross manner. In the plurality of belt layers 7, the inclination angle of the plurality of reinforcing cords with respect to the tire circumferential direction falls within a range of from 10° to 40°, for example. Steel cords are preferably used as the plurality of reinforcing cords of the plurality of belt layers 7. To improve high-speed durability, at least one belt cover layer 8, formed by arranging reinforcing cords at an angle of, for example, not greater than 5° with respect to the tire circumferential direction, is disposed on the outer circumferential side of the plurality of belt layers 7. Nylon, aramid, or similar organic fiber cords are preferably used as the reinforcing cords of the belt cover layer 8.

Note that the tire internal structure described above represents a typical example for a pneumatic tire, and the pneumatic tire is not limited thereto.

As illustrated in FIG. 2, the tread portion 1 is formed with four main grooves 11 to 14 extending in the tire circumferential direction. More specifically, the tread portion 1 is formed with: a center main groove 11 located on a vehicle inner side of a tire center line CL, a center main groove 12 located on a vehicle outer side of the tire center line CL, a shoulder main groove 13 located further on the vehicle inner side than the center main groove 11, and a shoulder main groove 14 located further on the vehicle outer side than the center main groove 12. Here, the center main groove 12 on the vehicle outer side has a chamfered portion 12A having a zigzag shape along the tire circumferential direction, but the other main grooves 11, 13, and 14 are linear.

With these four main grooves 11 to 14, the tread portion 1 is defined by: a center land portion 21 located on the tire center line CL, an inner side intermediate land portion 22 located further on the vehicle inner side than the center land portion 21, an outer side intermediate land portion 23 located further on the vehicle outer side than the center land portion 21, an inner side shoulder land portion 24 located further on the vehicle inner side than the inner side intermediate land portion 22, and an outer side shoulder land portion 25 located further on the vehicle outer side than the outer side intermediate land portion 23.

In each of the outer side intermediate land portion 23 and the outer side shoulder land portion 25 located on the vehicle outer side, a plurality of lug grooves 31, 32 extending in a tire width direction while being curved are formed at an interval in the tire circumferential direction. One end of each of the plurality of lug grooves 31 in the outer side intermediate land portion 23 communicates with the shoulder main groove 14 on the vehicle outer side, while the other end terminates in the outer side intermediate land portion 23. An opening end 31A of each of the plurality of lug grooves 31 in the outer side intermediate land portion 23 with respect to the shoulder main groove 14 on the vehicle outer side exists on an extension line of each of the plurality of lug grooves 32 in the outer side shoulder land portion 25. In other words, the opening end 31A of each of the plurality of lug grooves 31 is located on an extension line of an arc (dotted line in FIG. 2) passing through the groove width center of a curved portion of each of the plurality of lug grooves 32. A pair of the plurality of lug grooves 31 adjacent in the outer side intermediate land portion 23 are disposed so as not to overlap each other in the tire circumferential direction. On the other hand, one end of each of the plurality of lug grooves 32 in the outer side shoulder land portion 25 reaches at least a ground contact edge E, while the other end terminates in the outer side shoulder land portion 25. Note that the embodiment of FIG. 2 illustrates an example in which one end of each of the plurality of lug grooves 32 in the outer side shoulder land portion 25 reaches an end portion of the tread portion 1 beyond the ground contact edge E, but the embodiment is not limited to this.

In the center land portion 21, a plurality of sipes 41 extending in the tire width direction are formed at an interval in the tire circumferential direction. Each of the plurality of sipes 41 has: one end communicating with the center main groove 11 on the vehicle inner side; and the other end terminating in the center land portion 21.

In the inner side intermediate land portion 22, a plurality of lug grooves 33 extending in the tire width direction are formed at an interval in the tire circumferential direction. Each of the plurality of lug grooves 33 has: one end communicating with the shoulder main groove 13 on the vehicle inner side; and the other end terminating in the inner side intermediate land portion 22. Moreover, a plurality of sipes 42 extending in the tire width direction are formed in the inner side intermediate land portion 22 at an interval in the tire circumferential direction. Each of the plurality of sipes 42 has: one end communicating with the center main groove 11 on the vehicle inner side; and the other end terminating in the inner side intermediate land portion 22. Each of the plurality of sipes 42 is disposed on an extension line of each of the plurality of sipes 41 in the center land portion 21 that is opposed to the center main groove 11 in-between.

In the outer side intermediate land portion 23, each of the plurality of lug grooves 31 extending from the shoulder main groove 14 on the vehicle outer side toward a tire width direction inner side has a bent portion 31B that is bent like a hook toward one side in the tire circumferential direction on a terminal end side thereof. In the outer side intermediate land portion 23 in which the plurality of lug grooves 31 each having the bent portion 31B are formed, a plurality of narrow grooves 16 that extend intermittently along the tire circumferential direction are provided without communicating with the bent portion 31B. These plurality of narrow grooves 16 are disposed substantially parallel to the center main groove 12 having a zigzag shape.

A circumferential narrow groove 15 extending in the tire circumferential direction is formed in the inner side shoulder land portion 24. Moreover, a plurality of lug grooves 34 extending toward the tire width direction inner side from an end portion of the tread portion 1 are formed in the inner side shoulder land portion 24 at an interval in the tire circumferential direction. The plurality of lug grooves 34 intersect with the circumferential narrow groove 15, but terminate before reaching the shoulder main groove 13 on the vehicle inner side. Furthermore, on the inner side shoulder land portion 24, a plurality of sipes 43 extending in the tire width direction are formed at an interval in the tire circumferential direction. Each of the plurality of sipes 43 has: one end communicating with the shoulder main groove 13 on the vehicle inner side; and the other end terminating in the inner side shoulder land portion 24. The plurality of sipes 43 intersect the circumferential narrow groove 15.

In the outer side shoulder land portion 25, a plurality of sipes 44 extending in the tire width direction are formed at an interval in the tire circumferential direction. Each of the plurality of sipes 44 has: one end communicating with the shoulder main groove 14 on the vehicle outer side; and the other end terminating in the outer side shoulder land portion 25.

In the pneumatic tire described above, by adopting a structure in which the outer side intermediate land portion 23 and the outer side shoulder land portion 25 are not divided by the plurality of lug grooves 31 in the outer side intermediate land portion 23 and the plurality of lug grooves 32 in the outer side shoulder land portion 25, the rigidity of the outer side intermediate land portion 23 and the outer side shoulder land portion 25 may be sufficiently ensured, and thus the steering stability performance on dry road surfaces may be improved. Moreover, the opening end 31A of each of the plurality of lug grooves 31 in the outer side intermediate land portion 23 with respect to the shoulder main groove 14 on the vehicle outer side is present on an extension line of each of the plurality of lug grooves 32 in the outer side shoulder land portion 25, so it is possible to reduce the fluctuation in the groove area, and contribute to the improvement in drainage performance. Furthermore, the pair of the plurality of lug grooves 31 adjacent to each other in the outer side intermediate land portion 23 are disposed so as not to overlap with each other in the tire circumferential direction, so the rigidity of the outer side intermediate land portion 23 may be further improved. As a result, both steering stability performance on dry road surfaces and steering stability performance on wet road surfaces may be achieved in a compatible manner.

In the pneumatic tire, the inner side shoulder land portion 24 has the circumferential narrow groove 15 that extends in the tire circumferential direction; the center land portion 21, the inner side intermediate land portion 22, and the inner side shoulder land portion 24 each has the plurality of sipes 41 to 43; one end of each of the plurality of sipes 41 in the center land portion 21 communicates with the center main groove 11 on the vehicle inner side, while the other end terminates in the center land portion 21; one end of each of the plurality of sipes 42 in the inner side intermediate land portion 22 communicates with the center main groove 11 on the vehicle inner side, while the other end terminates in the inner side intermediate land portion 22; each of the plurality of sipes 42 in the inner side intermediate land portion 22 is disposed on an extension line of each of the plurality of sipes 41 in the center land portion 21; and one end of each of the plurality of sipes 43 in the inner side shoulder land portion 24 communicates with the shoulder main groove 13 on the vehicle inner side, while the other end terminates in the inner side shoulder land portion 24, with each of the plurality of sipes 43 preferably intersecting the circumferential narrow groove 15. As described above, by providing the circumferential narrow groove 15 extending in the tire circumferential direction in the inner side shoulder land portion 24 and by providing the plurality of sipes 41 to 43 in the center land portion 21 and each of the land portions 22 and 24 on the vehicle inner side, the drainage performance may be effectively improved. In addition, by providing sipes instead of lug grooves in each of the land portions 21, 22, and 24, sufficient drainage performance may be ensured without excessively increasing a groove area ratio D of each land portion 21, 22, 24.

In particular, in the pneumatic tire described above, the center main groove 12 on the vehicle outer side has a chamfered portion 12A having a zigzag shape; each of the plurality of lug grooves 31 in the outer side intermediate land portion 23 have a bent portion 31B bent toward one side in the tire circumferential direction; the plurality of narrow grooves 16 that extend intermittently along the tire circumferential direction are provided in the outer side intermediate land portion 23 without communicating with the bent portion 31B, with the plurality of narrow grooves 16 preferably being disposed substantially parallel to the center main groove 12 on the vehicle outer side. The center main groove 12 having a zigzag shape contributes to improvement in steering stability performance on wet road surfaces based on an edge effect thereof. In addition, by providing the bent portion 31B in each of the plurality of lug grooves 31 in the outer side intermediate land portion 23 and by providing the plurality of narrow grooves 16 intermittently along the tire circumferential direction, the effect of improving the wet performance may be increased based on the edge effect of the bent portion 31B and the plurality of narrow grooves 16. Furthermore, by disposing the plurality of narrow grooves 16 substantially parallel to the center main groove 12 having a zigzag shape, the rigidity of the outer side intermediate land portion 23 may be made uniform, and the occurrence of uneven wear may be suppressed.

Moreover, in the pneumatic tire described above, each of the plurality of lug grooves 32 in the outer side shoulder land portion 25 are located on a center line L passing through a leading edge portion 31C of each of the plurality of lug grooves 31 in the outer side intermediate land portion 23 or on a position within 2 mm in the tire circumferential direction from the center line L. By disposing the plurality of lug grooves 32 in this manner, sufficient drainage performance may be ensured, and steering stability performance on wet road surfaces may be effectively improved.

Furthermore, in the pneumatic tire described above, the groove area ratio $D_{CE}$ of the center land portion 21, the groove area ratio $D_{INMD}$ of the inner side intermediate land portion 22, the groove area ratio $D_{INSH}$ of the inner side shoulder land portion 24, the groove area ratio $D_{OUTMD}$ of the outer side intermediate land portion 23, and the groove area ratio $D_{OUTSH}$ of the outer side shoulder land portion 25 satisfy the relationship $D_{INSH} > D_{OUTMD} > D_{OUTSH} > D_{INMD} > D_{CE}$. In particular, preferably the groove area ratio D of each of the land portions 21 to 25 is not equal, or in other words, satisfy the relationship $D_{INSH} > D_{OUTMD} > D_{OUTSH} > D_{INMD} > D_{CE}$. By the groove area ratio D of each of the land portions 21 to 25 satisfying the above relationship, it is possible to sufficiently ensure the rigidity of each of the land portions 21 to 25 while maintaining good drainage performance. This makes it possible to improve the steering stability performance on dry road surfaces and the steering stability performance on wet road surfaces in a well-balanced manner. In particular, setting the groove area ratio $D_{INSH}$ of the inner side shoulder land portion 24 to the maximum contributes to the improvement in the steering stability performance on wet road surfaces, and making the groove area ratio $D_{OUTSH}$ of the outer side shoulder land portion 25 relatively small contributes to improved steering stability performance on dry road surfaces. Note that in calculating the groove area ratio $D_{CE}$ of the center land portion 21 and the groove area ratio $D_{OUTMD}$ of the outer side intermediate land portion 23, the total area of the center land portion 21 and the outer side intermediate land portion 23 that are denominators are calculated based on the total area in a state in which a chamfered portion is not formed in the center main groove 12, or in other words, a state in which the center main groove 12 is linear.

Figure 3:
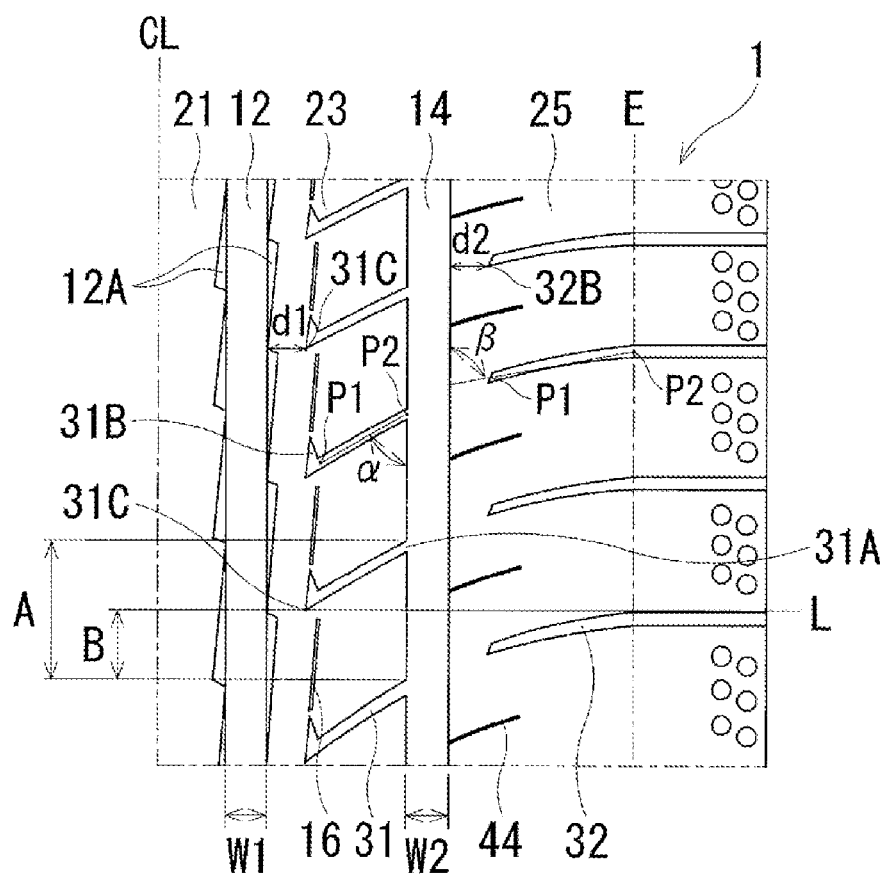
FIG. 3 is a plan view illustrating a main part of the tread pattern of FIG. 2.

As illustrated in FIG. 3, an inclination angle α of each of the plurality of lug grooves 31 in the outer side intermediate land portion 23 on the acute angle side with respect to the tire circumferential direction is set to be smaller than an inclination angle β of each of the plurality of lug grooves 32 in the outer side shoulder land portion 25 on the acute angle side with respect to the tire circumferential direction. In this case, the inclination angle α of each of the plurality of lug grooves 31 is preferably in the range of from 50° to 70°, and the inclination angle β of each of the plurality of lug grooves 32 is preferably in the range of from 75° to 85°. By setting the inclination angle α of each of the plurality of lug grooves 31 to be smaller than the inclination angle β of each of the plurality of lug grooves 32 in this manner, sufficient rigidity of the outer side intermediate land portion 23 may be ensured while maintaining good drainage performance. This makes it possible to improve the steering stability performance on dry road surfaces and the steering stability performance on wet road surfaces in a well-balanced manner. Note that the inclination angle α of each of the plurality of lug grooves 31 is an angle formed by a straight line connecting groove width center positions P1, P2 at both ends in a longitudinal direction of each of the plurality of lug grooves 31, excluding the bent portion 31B, with respect to the tire circumferential direction, and the inclination angle β is an angle formed by a straight line connecting the groove width center positions P1, P2 of each of the plurality of lug grooves 32 at both ends in the longitudinal direction of the curved portion with respect to the tire circumferential direction.

Moreover, a rib width d1 from the leading edge portion 31C of each of the plurality of lug grooves 31 to the center main groove 12 in the outer side intermediate land portion 23 is narrower than a groove width W1 of the center main groove 12, and a rib width d2 from the leading edge portion 32B of each of the plurality of lug grooves 32 in the outer side shoulder land portion 25 to the shoulder main groove 14 is narrower than a groove width W2 of the shoulder main groove 14. In particular, the ratio of the rib width d1 to the groove width W1 of the center main groove 12 and the ratio of the rib width d2 to the groove width W2 of the shoulder main groove 14 are both preferably in the range of from 70% to 95%. By making the rib widths d1 and d2 narrower than the groove widths W1 and W2 in this way, the drainage performance may be improved while ensuring the rigidity of the outer side intermediate land portion 23 and the outer side shoulder land portion 25. This makes it possible to improve the steering stability performance on dry road surfaces and the steering stability performance on wet road surfaces in a well-balanced manner. Note that the groove width W1 of the center main groove 12 is the width excluding the chamfered portion 12A, the rib width d1 is the interval in the tire width direction between the leading edge portion 31C of each of the plurality of lug grooves 31 and the center main groove 12, and the rib width d2 is the interval in the tire width direction between the leading edge portion 32B of each of the plurality of lug grooves 32 and the shoulder main groove 14.

Furthermore, a pitch length A of the pair of the plurality of lug grooves 31 in the outer side intermediate land portion 23 and a shortest distance B in the tire circumferential direction of the pair of the plurality of lug grooves 31 in the outer side intermediate land portion 23 preferably satisfy the relationship A×0.4≤B≤A×0.5. By satisfying the above relationship between the pitch length A and the shortest distance B of the pair of the plurality of lug grooves 31, it is possible to sufficiently ensure the rigidity of the outer side intermediate land portion 23 while maintaining good drainage performance. This makes it possible to improve the steering stability performance on dry road surfaces and the steering stability performance on wet road surfaces in a well-balanced manner. Note that the pitch length A of the pair of the plurality of lug grooves 31 is a distance between the corresponding base points of adjacent two of the plurality of lug grooves 31, and the shortest distance B of the pair of the plurality of lug grooves 31 is the shortest distance in the tire circumferential direction between the center line L passing through the leading edge portion 31C of one of the plurality of lug grooves 31 and the other of the plurality of lug grooves 31 of the adjacent two of the plurality of lug grooves 31.

Example

Tires of Examples 1 to 6 were manufactured such that a pneumatic tire having a tire size of 225/45R18 includes a tread portion, a pair of sidewall portions, and a pair of bead portions; the tread portion is provided with four main grooves including a pair of center main grooves and a pair of shoulder main grooves extending in a tire circumferential direction; these main grooves define a center land portion, a pair of intermediate land portions located on an outer side of the center land portion, and a pair of shoulder land portions located on an outer side of the intermediate land portions, with a mounting direction of the tire on a vehicle being specified; as illustrated in FIG. 2, a plurality of lug grooves that extend in a tire width direction while being curved are provided in the shoulder land portion on a vehicle outer side and the intermediate land portion on the vehicle outer side; one end of each of the lug grooves in the shoulder land portion on the vehicle outer side reaches at least a ground contact edge, while the other end terminates in the shoulder land portion on the vehicle outer side; one end of each of the lug grooves in the intermediate land portion on the vehicle outer side communicates with the shoulder main groove on the vehicle outer side, while the other end terminates in the intermediate land portion on the vehicle outer side; an opening end of each of the lug grooves in the intermediate land portion on the vehicle outer side with respect to the shoulder main groove on the vehicle outer side exists on an extension line of each of the lug grooves in the shoulder land portion on the vehicle outer side; and a pair of the plurality of lug grooves adjacent in the intermediate land portion on the vehicle outer side are disposed so that they do not overlap each other in the tire circumferential direction.

For comparison, tires of a Conventional Example were prepared so as to have the same structure as in Example 1 except that the opening end of each of the lug grooves in the intermediate land portion on the vehicle outer side with respect to the shoulder main groove does not exist on the extension line of each of the lug grooves in the shoulder land portion on the vehicle outer side.

In Examples 1 to 6, an inclination angle α of each of the lug grooves in the intermediate land portion on the vehicle outer side; an inclination angle β of each of the lug grooves in the shoulder land portion on the vehicle outer side; a ratio of a rib width d1 of the intermediate land portion on the vehicle outer side to a groove width W1 of the center main groove on the vehicle outer side; a ratio of a rib width d2 of the shoulder land portion on the vehicle outer side to a groove width W2 of the shoulder main groove on the vehicle outer side; a distance from each of the lug grooves in the shoulder land portion on the vehicle outer side to a center line L in the tire circumferential direction; a groove area ratio $D_{CE}$ of the center land portion; a groove area ratio $D_{INMD}$ of the intermediate land portion on a vehicle inner side; a groove area ratio $D_{OUTSH}$ of the shoulder land portion on the vehicle outer side; a groove area ratio $D_{OUTMD}$ of the intermediate land portion on the vehicle outer side; and a groove area ratio $D_{INSH}$ of the shoulder land portion on the vehicle inner side are set as in Table 1. In Table 1, a case where the relationship between the lug grooves is a "mismatch" means that the opening end of each of the lug grooves in the intermediate land portion on the vehicle outer side with respect to the shoulder main groove does not exist on the extension line of each of the lug grooves in the shoulder land portion on the vehicle outer side, and a case where the relationship between the lug grooves is a "match" means that the opening end of each of the lug grooves in the intermediate land portion on the vehicle outer side with respect to the shoulder main groove exists on the extension line of each of the lug grooves in the shoulder land portion on the vehicle outer side.

These test tires were evaluated for the steering stability performance on dry road surfaces and the steering stability performance on wet road surfaces by the following test methods, and the results are also given in Table 1.

Steering Stability Performance on Dry Road Surfaces:

Each test tire was mounted on a wheel with a rim size of 18×7.5J, and mounted on a vehicle with an engine displacement of 2000 cc, and sensory evaluation was conducted by a panelist when running on a dry road surface. The evaluation results are indicated using 10-level evaluation values. The larger the evaluation value is, the better the steering stability performance is on dry road surfaces.

Steering Stability Performance on Wet Road Surfaces:

Each test tire was mounted on a wheel with a rim size of 18×7.5J, and mounted on a vehicle with an engine displacement of 2000 cc, and sensory evaluation was conducted by a panelist when running on a wet road surface. The evaluation results are indicated using 10-level evaluation values. The larger the evaluation value is, the better the steering stability performance is on wet road surfaces.

TABLE 1-1

|  | Conventional Example | Example 1 | Example 2 |
|---|---|---|---|
| Relationship between lug grooves | Mismatch | Match | Match |
| Inclination angle α of the lug grooves in the intermediate land portion on the vehicle outer side | 80° | 80° | 60° |
| Inclination angle β of the lug grooves in the shoulder land portion on the vehicle outer side | 80° | 80° | 80° |
| Ratio of the rib width d1 of the intermediate land portion on the vehicle outer side to the groove width W1 of the center main groove on the vehicle outer side | 1.0 | 1.0 | 1.0 |
| Ratio of the rib width d2 of the shoulder land portion on the vehicle outer side to the groove width W2 of the shoulder main groove on the vehicle outer side | 1.0 | 1.0 | 1.0 |
| Distance in the tire circumferential direction from each of the lug grooves to the center line L in the shoulder land portion on the vehicle outer side | 5 mm | 5 mm | 5 mm |
| Groove area ratio of the center land portion $D_{CE}$ | 0.01 | 0.01 | 0.01 |
| Groove area ratio of the intermediate land portion on the vehicle inner side $D_{INMD}$ | 0.07 | 0.07 | 0.07 |
| Groove area ratio of the shoulder land portion on the vehicle outer side $D_{OUTSH}$ | 0.07 | 0.07 | 0.07 |
| Groove area ratio of the intermediate land portion on the vehicle outer side $D_{OUTMD}$ | 0.07 | 0.07 | 0.07 |
| Groove area ratio of the shoulder land portion on the vehicle inner side $D_{INSH}$ | 0.11 | 0.11 | 0.11 |
| Steering stability performance on dry road surfaces | 5.0 | 5.0 | 5.5 |
| Steering stability performance on wet road surfaces | 5.0 | 5.5 | 5.5 |

TABLE 1-2

|  | Example 3 | Example 4 | Example 5 | Example 6 |
|---|---|---|---|---|
| Relationship between lug grooves | Match | Match | Match | Match |
| Inclination angle α of the lug grooves in the intermediate land portion on the vehicle outer side | 60° | 60° | 60° | 60° |
| Inclination angle β of the lug grooves in the shoulder land portion on the vehicle outer side | 80° | 80° | 80° | 80° |
| Ratio of the rib width d1 of the intermediate land portion on the vehicle outer side to the groove width W1 of the center main groove on the vehicle outer side | 0.9 | 0.9 | 0.9 | 0.9 |
| Ratio of the rib width d2 of the shoulder land portion on the vehicle outer side to the groove width W2 of the shoulder main groove on the vehicle outer side | 0.8 | 0.8 | 0.8 | 0.8 |
| Distance in the tire circumferential direction from each of the lug grooves to the center line L in the shoulder land portion on the vehicle outer side | 5 mm | 0 mm | 0 mm | 0 mm |
| Groove area ratio of the center | 0.01 | 0.01 | 0.01 | 0.01 |

TABLE 1-2-continued

| | Example 3 | Example 4 | Example 5 | Example 6 |
|---|---|---|---|---|
| land portion $D_{CE}$ | | | | |
| Groove area ratio of the intermediate land portion on the vehicle inner side $D_{INMD}$ | 0.07 | 0.07 | 0.07 | 0.07 |
| Groove area ratio of the shoulder land portion on the vehicle outer side $D_{OUTSH}$ | 0.07 | 0.07 | 0.07 | 0.08 |
| Groove area ratio of the intermediate land portion on the vehicle outer side $D_{OUTMD}$ | 0.07 | 0.07 | 0.09 | 0.09 |
| Groove area ratio of the shoulder land portion on the vehicle inner side $D_{INSH}$ | 0.11 | 0.11 | 0.11 | 0.11 |
| Steering stability performance on dry road surfaces | 6.0 | 6.0 | 6.0 | 6.0 |
| Steering stability performance on wet road surfaces | 5.5 | 6.0 | 6.5 | 7.5 |

As can be seen from Table 1, the tires of Examples 1 to 6 were able to simultaneously improve the steering stability performance on dry road surfaces and the steering stability performance on wet road surfaces in comparison with the Conventional Example.

The invention claimed is:

1. A pneumatic tire, comprising:
a tread portion extending in a tire circumferential direction and having an annular shape;
a pair of sidewall portions disposed on both sides of the tread portion; and
a pair of bead portions each disposed on a tire radial direction inner side of the pair of sidewall portions;
the tread portion being provided with four main grooves comprising a pair of center main grooves and a pair of shoulder main grooves extending in the tire circumferential direction;
a center land portion, a pair of intermediate land portions each located on an outer side of the center land portion, and a pair of shoulder land portions each located on an outer side of the pair of intermediate land portions being defined by the main grooves, with a mounting direction of the pneumatic tire being designated with respect to a vehicle;
the shoulder land portion on a vehicle outer side and the intermediate land portion on the vehicle outer side each comprising a plurality of lug grooves extending in a tire width direction while being curved;
one end of each of the plurality of lug grooves in the shoulder land portion on the vehicle outer side reaching at least a ground contact edge, while an other end terminates in the shoulder land portion on the vehicle outer side between the shoulder main groove on the vehicle outer side and the ground contact edge;
one end of each of the plurality of lug grooves in the intermediate land portion on the vehicle outer side communicating with the shoulder main groove on the vehicle outer side, while an other end terminates in the intermediate land portion on the vehicle outer side;
an opening end of each of the plurality of lug grooves in the intermediate land portion on the vehicle outer side with respect to the shoulder main groove on the vehicle outer side being present on an extension line of each of the plurality of lug grooves in the shoulder land portion on the vehicle outer side;
a pair of the plurality of lug grooves adjacent in the intermediate land portion on the vehicle outer side being disposed so as not to overlap each other in the tire circumferential direction;
each of the plurality of lug grooves in the intermediate land portion on the vehicle outer side having a bent portion bent toward one side in the tire circumferential direction;
a plurality of narrow grooves extending intermittently along the tire circumferential direction without communicating with the bent portion are provided in the intermediate land portion on the vehicle outer side, the plurality of narrow grooves having a narrower groove width than a groove width of each of the plurality of lug grooves in the intermediate land portion; and
a groove area ratio $D_{CE}$ of the center land portion, a groove area ratio $D_{INMD}$ of the intermediate land portion on a vehicle inner side, a groove area ratio $D_{INSH}$ of the shoulder land portion on the vehicle inner side, a groove area ratio $D_{OUTMD}$ of the intermediate land portion on the vehicle outer side, and a groove area ratio $D_{OUTSH}$ of the shoulder land portion on the vehicle outer side satisfy a relationship $D_{INSH} > D_{OUTMD} > D_{OUTSH} \geq D_{INMD} > D_{CE}$.

2. The pneumatic tire according to claim 1, wherein,
an inclination angle of each of the plurality of lug grooves in the intermediate land portion on the vehicle outer side on an acute angle side with respect to the tire circumferential direction is smaller than an inclination angle of each of the plurality of lug grooves in the shoulder land portion on the vehicle outer side on an acute angle side with respect to the tire circumferential direction.

3. The pneumatic tire according to claim 1, wherein,
a rib width from a leading edge portion of each of the plurality of lug grooves to the center main groove in the intermediate land portion on the vehicle outer side is narrower than a groove width of the center main groove on the vehicle outer side, and
a rib width from a leading edge portion of each of the plurality of lug grooves to the shoulder main groove in the shoulder land portion on the vehicle outer side is narrower than a groove width of the shoulder main groove on the vehicle outer side.

4. The pneumatic tire according to claim 1, wherein,
each of the plurality of lug grooves in the shoulder land portion on the vehicle outer side is located on a center line passing through a leading edge portion of each of the plurality of lug grooves in the intermediate land portion on the vehicle outer side or on a position within 2 mm in the tire circumferential direction from the center line.

5. The pneumatic tire according to claim 1, wherein
a pitch length A of each of the plurality of lug grooves in the intermediate land portion on the vehicle outer side and a shortest distance B in the tire circumferential direction of each of the plurality of lug grooves in the intermediate land portion on the vehicle outer side satisfy a relationship $A \times 0.4 \leq B \leq A \times 0.5$.

6. The pneumatic tire according to claim 1, wherein
the shoulder land portion on a vehicle inner side comprises a circumferential narrow groove extending in the tire circumferential direction;
the center land portion, and the intermediate land portion and the shoulder land portion on the vehicle inner side each comprise a plurality of sipes extending in the tire width direction;

one end of each of the plurality of sipes in the center land portion communicates with the center main groove on the vehicle inner side, while an other end terminates in the center land portion;

one end of each of the plurality of sipes in the intermediate land portion on the vehicle inner side communicates with the center main groove on the vehicle inner side while an other end terminates in the intermediate land portion on the vehicle inner side, and each of the plurality of sipes in the intermediate land portion on the vehicle inner side is on an extension line of each of the plurality of sipes in the center land portion; and one end of each of the plurality of sipes in the shoulder land portion on the vehicle inner side communicates with the shoulder main groove on the vehicle inner side, while an other end terminates in the shoulder land portion on the vehicle inner side and intersects the circumferential narrow groove.

7. The pneumatic tire according to claim 1, wherein the center main groove on the vehicle outer side has a chamfered portion having a zigzag shape; and the plurality of narrow grooves are disposed substantially parallel to the center main groove on the vehicle outer side.

8. The pneumatic tire according to claim 2, wherein, a rib width from a leading edge portion of each of the plurality of lug grooves to the center main groove in the intermediate land portion on the vehicle outer side is narrower than a groove width of the center main groove on the vehicle outer side, and a rib width from a leading edge portion of each of the plurality of lug grooves to the shoulder main groove in the shoulder land portion on the vehicle outer side is narrower than a groove width of the shoulder main groove on the vehicle outer side.

9. The pneumatic tire according to claim 8, wherein, each of the plurality of lug grooves in the shoulder land portion on the vehicle outer side is located on a center line passing through a leading edge portion of each of the plurality of lug grooves in the intermediate land portion on the vehicle outer side or on a position within 2 mm in the tire circumferential direction from the center line.

10. The pneumatic tire according to claim 9, wherein a pitch length A of each of the plurality of lug grooves in the intermediate land portion on the vehicle outer side and a shortest distance B in the tire circumferential direction of each of the plurality of lug grooves in the intermediate land portion on the vehicle outer side satisfy a relationship $A \times 0.4 \leq B \leq A \times 0.5$.

11. The pneumatic tire according to claim 10, wherein the shoulder land portion on a vehicle inner side comprises a circumferential narrow groove extending in the tire circumferential direction;

the center land portion, and the intermediate land portion and the shoulder land portion on the vehicle inner side each comprise a plurality of sipes extending in the tire width direction;

one end of each of the plurality of sipes in the center land portion communicates with the center main groove on the vehicle inner side, while an other end terminates in the center land portion;

one end of each of the plurality of sipes in the intermediate land portion on the vehicle inner side communicates with the center main groove on the vehicle inner side while an other end terminates in the intermediate land portion on the vehicle inner side, and each of the plurality of sipes in the intermediate land portion on the vehicle inner side is on an extension line of each of the plurality of sipes in the center land portion; and one end of each of the plurality of sipes in the shoulder land portion on the vehicle inner side communicates with the shoulder main groove on the vehicle inner side, while an other end terminates in the shoulder land portion on the vehicle inner side and intersects the circumferential narrow groove.

12. The pneumatic tire according to claim 11, wherein the center main groove on the vehicle outer side has a chamfered portion having a zigzag shape; and the plurality of narrow grooves are disposed substantially parallel to the center main groove on the vehicle outer side.

* * * * *